United States Patent Office 3,355,297
Patented Nov. 28, 1967

3,355,297
PROCESSES FOR TREATING WORT
Keith Christopher Stowell, Newark, England, assignor to
J. M. Collet & Company Limited, Gloucester, England
No Drawing. Filed Jan. 9, 1964, Ser. No. 336,620
Claims priority, application Great Britain, Jan. 25, 1963,
3,188/63
10 Claims. (Cl. 99—52)

During the storage of beer under normal commercial conditions it is essential that its clarity is maintained, and that the onset of haze formation is delayed, as long as possible. In recent years, it has been established by numerous workers that the components of this non-biological haze are primarily protein-polyphenol complexes and that elimination or reduction of the haze potential in beer requires the degradation or removal of either the offending protein or the polyphenol constituent. The polyphenols mostly belong to a group of compounds known as anthocyanogens and it has been shown that substantial amounts of anthocyanogens originate from the grist from which wort is prepared and usually from malt which is the basic raw material of the grist used in brewing. These compounds are brought into solution in the wort during the mashing process and they are not eliminated to any extent during normal brewing operations.

Various procedures have been evolved for the removal of anthocyanogens from beer and wort with consequent improvement in haze stability. These are based on the properties of certain commercial preparations (for example, nylon powder) selectively to absorb the anthocyanogen from the wort or beer. These methods are of limited value as the selectivity of these preparations is such as to cause the absorption and removal of some desirable wort or beer constituents; moreover, the cost of application of such a treatment is by no means insignificant.

The present invention concerns a process for a reduction or elimination of anthocyanogens which is relatively cheap and easy to apply and which produces no apparent undesirable side effects.

According to this invention a process for treating wort is characterised in that formaldehyde (or a polymer of formaldehyde) is added to the wort to eliminate, in part at least, anthocyanogens therein. Moreover, it has been shown that the resistance to haze development of a beer treated with formaldehyde during manufacture on a laboratory scale is substantially better than that of the untreated control. It is a preferred feature of this invention that formaldehyde (or a polymer of formaldehyde) is introduced to the mash during the operation of mashing the grist and preferably at, or near, the start of the mashing operation. Preferably the formaldehyde, or a polymer thereof, is added to the mash in which event it may be arranged that the formaldehyde (or one of its polymers) is introduced to the mash with one, or more, of the mash ingredients.

According to a feature of this invention 50 or more parts per million of formaldehyde (or a polymer thereof) with respect to the initial or so-called as is weight of the grist from which the wort is prepared is added thereto to produce at least a reduction in the anthocyanogens in the wort and it is preferred that between 50 and 500 parts per million of formaldehyde, or a polymer of formaldehyde, is so added. Formaldehyde concentrations of more than 500 parts per million are also clearly effective in reducing the anthocyanogen content and the haze potential, as will be later explained. Although these effects are achieved with concentrations above 500 parts per million, quantities in excess of 500 parts per million or thereabouts are unnecessary and it is prudent to use the lower concentrations not only for economy but also to minimize the risk of possible adverse side effects, e.g. on flavour, which could perhaps arise with high concentrations of formaldehyde. The effect described in this invention, however, is noticeable at all concentrations above 50 parts per million and the upper concentration is only limited by other considerations, such as those just noted.

According to a further feature of the present invention the formaldehyde, or a polymer of formaldehyde, is added to the mash during the first half of the total time of the mashing operation, desirably during the first quarter of this operation and preferably within the first one sixth of said operation. The formaldehyde or its polymer may be added as a liquid to the water used for mashing immediately prior to commencement of the mashing operation or it may be added to the solution of grist and water in the masher at the start of the mashing operation. With both procedures the additive is intimately mixed and distributed throughout the mash during the normal mashing operation.

According to another feature of this invention the polymer of formaldehyde may be, for example, paraformaldehyde which has been solubilised in water.

Tests have established that the addition of formaldehyde and of paraformaldehyde at the start of the mashing operation, as provided by this invention, result in almost complete removal of the anthocyanogens in the mash tun. The mechanism whereby this result is achieved is not fully understood but the procedure of the present invention does not appear to produce undesirable side effects. It has been noted that the removal of anthocyanogens in this way is accompanied by a slight fall in the soluble nitrogen content of the wort but this reduction is relatively small and does not appear adversely to influence the subsequent processing into beer.

If formaldehyde is added to the wort late in the mashing operation, or subsequently thereto, the elimination of anthocyanogens is less pronounced and there are also undesirable side effects causing hazy discoloured wort. Accordingly while the present invention is not limited to introduction of formaldehyde (or a polymer of formaldehyde) at the start of the mashing operation, this is preferred.

Various laboratory test results will now be set forth wherein all mashes have been prepared according to the Standard Method of the Institute of Brewing (see the Journal of the Institute of Brewing, 1961, page 315).

To determine the anthocyanogen content of the wort in these tests 10 ml. of wort was shaken with 500 mg. of nylon powder (type DS 3276) for 30 minutes. The nylon powder was filtered from the wort, washed with distilled water, and dissolved in 15 ml. of a hot butanol hydrochloric acid reagent (5 volumes butanol to 1 volume concentrated hydrochloric acid). The mixture was heated in a boiling water bath for 30 minutes, cooled and made up to 25 ml. with a butanol/hydrochloric acid reagent. The Spekker value was determined using a 25 mm. cell and 605 Ilford Filter in a Hilger Spekker Absorptiometer.

Spekker values are approximately directly proportional to the anthocyanogen content of the wort.

Table I indicates the correlation between the addition of varying quantities of formaldehyde at the commencement of mashing and the reduction of the anthocyanogen and soluble nitrogen content of the wort.

TABLE I

| Formaldehyde concentration (p.p.m.) with respect to the as is weight of grist | Spekker value (proportional to anthocyanogen content) | Total soluble nitrogen content of wort (percent) |
|---|---|---|
| Nil | 0.330 | 0.44 |
| 50 | 0.260 | 0.44 |
| 100 | 0.216 | 0.43 |
| 150 | 0.167 | 0.43 |
| 200 | 0.112 | 0.43 |
| 250 | 0.091 | 0.42 |
| 500 | 0.061 | 0.41 |
| 1,000 | 0.053 | 0.40 |

Table I establishes that formaldehyde concentrations above 500 parts per million produce almost negligible further reductions in anthocyanogen contents and that the optimum concentration range is between 50 and 500 parts per million. A reduction in the soluble nitrogen content of the wort as a consequence of the addition of formaldehyde is clearly established but this reduction is relatively small.

Table II indicates the effect of formaldehyde on the anthocyanogen content of the final wort when the addition of the formaldehyde is made to the mash at various times after mashing is commenced.

TABLE II

| Time of addition of formaldehyde (250 p.p.m. with respect to the as is weight of grist) after the commencement of mashing. Total mashing time 60 minutes.) | Spekker value (proportional to anthocyanogen content) |
|---|---|
| Control (no addition) | 0.310 |
| 0 mins | 0.090 |
| 5 mins | 0.099 |
| 10 mins | 0.122 |
| 15 mins | 0.134 |
| 30 mins | 0.155 |
| 45 mins | 0.190 |
| 60 mins | 0.227 |

Table II clearly establishes that the most effective reduction in anthocyanogen concentration is obtained by the addition of formaldehyde at the commencement of the meshing operation. This conclusion is also to be noted from Table III which indicates the relationship between the addition of formaldehyde to a prepared wort and the reduction of anthocyanogen content. The formaldehyde is added just prior to the specified treatment.

TABLE III

| Treatment of wort | Formaldehyde content (p.p.m. with respect to as is weight of grist) | Spekker value (proportional to anthocyanogen content) |
|---|---|---|
| Stand at laboratory temperature for 1 hr | Nil | 0.410 |
| Do | 500 | 0.328 |
| Boiled to half volume, made up to original volume and filtered | Nil | 0.362 |
| Do | 500 | 0.194 |

It is noted from Table III that although reductions in anthocyanogen content have been achieved by the addition of formaldehyde to a prepared wort the reduction is smaller than when the formaldehyde is introduced at the commencement of, or during, mashing i.e. when the wort is being prepared.

TABLE IV

| Concentrations of paraformaldehyde (p.p.m. with respect to as is weight of grist) | Spekker value (proportional to anthocyanogen content) |
|---|---|
| Nil | 0.310 |
| 50 | 0.270 |
| 100 | 0.220 |
| 250 | 0.125 |
| 500 | 0.099 |
| 1,000 | 0.054 |

Table IV illustrates the effect on the anthocyanogen content of paraformaldehyde addition to the wort, the paraformaldehyde being introduced at the commencement of mashing. Paraformaldehyde, a polymer of formaldehyde, was solubilized by treatment with sodium hydroxide solution and neutralisation with sulphuric acid prior to its addition to the mash as a solution, the mashing period being 1 hour.

The effect of paraformaldehyde is similar to that of formaldehyde itself.

The results obtained from an investigation into the effect of a wide range of other aldehydes on the anthocyanogen content of wort, when added at the commencement of mashing, is indicated in Table V. All additions were at a concentration of 500 parts per million with respect to the as is weight of grist unless otherwise stated.

TABLE V

| Substance added: | Spekker value |
|---|---|
| Control (no addition) | 0.340 |
| Acetaldehyde | 0.340 |
| n-Butyraldehyde | 0.335 |
| n-Propionic aldehyde | 0.340 |
| n-Valeric aldehyde | 0.320 |
| Citral | 0.300 |
| Furfuraldehyde | 0.332 |
| Furfuraldehyde (25,000 p.p.m.) | 0.290 |

None of the aldehydes specified had any material effect on the anthocyanogen content of the wort. Since the substances tested form a wide range of aldehydes it appears in general that these as a class of compounds are not very effective, if at all, and that the results of the present invention are achieved only by the use of formaldehyde or one of its polymers i.e. the properties of formaldehyde which cause the reduction in anthocyanogens are specific to this aldehyde.

Formaldehyde (and polymers of formaldehyde) are well known reducing agents. Accordingly a number of other equally well known reducing agents were added to the wort to determine the effect on the anthocyanogen content thereof. The results are set forth in Table VI. Each of these agents were added at the commencement of mashing and all additions are at a concentration of 500 parts per million with respect to the as is weight of grist, the mashing period being 1 hour.

TABLE VI

| Substance added: | Spekker value |
|---|---|
| Control (no addition) | 0.345 |
| Potassium oxalate | 0.328 |
| Sodium sulphide | 0.320 |
| Sodium sulphite | 0.304 |
| Sodium meta bisulphite | 0.293 |
| Sodium dithionite | 0.278 |
| Ascorbic acid | 0.360 |

Table VI establishes that these reducing agents are relatively ineffective in achieving a reduction in the anthocyanogen content of the wort.

An experiment was designed to illustrate the effect of formaldehyde (or one of its polymers) on the haze stability of a beer produced from a treated wort, and to link the improved stability with the reduction in anthocyanogen content of the wort. Two of the worts (viz. the untreated control and that treated with 500 parts per million of formaldehyde at commencement of mashing) prepared for the test report in Table I were further processed in the laboratory to produce an experimental beer. The worts were boiled with hops, filtered, fermented with yeast and filtered again. Each sample was divided into nine portions and bottled in airtight glass vessels. Samples of the formaldehyde treated beer and of the untreated control beer were allowed to stand at room temperature for from one to eight months and were examined for haze stability at monthly intervals. The following results were obtained.

TABLE VII

| | At Bottling | Period after bottling (months) | | | | | | | |
|---|---|---|---|---|---|---|---|---|---|
| | | 1 | 2 | 3 | 4 | 5 | 6 | 7 | 8 |
| Control | 0.6 | 2.5 | | | | | | | |
| Treated | 0.4 | 0.3 | 0.4 | 0.5 | 0.4 | 0.4 | 0.4 | 0.5 | 0.7 |

The haze developed was measured in the standard units of the European Brewery Convention i.e. °E.B.C.

The anthocyanogen content of the control beer (at the time of bottling) was 38 mg./l. and the anthocyanogen content of the treated beer was 9.5 mg./l. at bottling.

The haze content tends to rise as time passes. A value of about 3.0° E.B.C. represents a beer which is unacceptable. This condition nearly exists at the end of the first month with the control beer and readings beyond the first month were not taken since the beer must by that time have attained a state at which it was clearly unacceptable.

This experiment clearly indicates that formaldehyde treatment reduces the haze potential of beers and improves their "shelf life" or storage properties. Moreover, this improvement in stability is clearly correlated to the reduction in the anthocyanogen content of the worts. It must be made clear, however, that the improved haze potential is not necessarily a direct result of the fall in anthocyanogen content of the wort, although the two effects are associated with each other.

*Summary of tests*

Within the range of the present series of tests Table V establishes that an effective reduction in the anthocyanogen content of wort is achieved by a specific aldehyde, namely, formaldehyde (or its polymers) whilst Table VI establishes that the effect observed with formaldehyde or its polymers is not a general property of reducing agents, since other reducing agents do not give similar responses. Tables I, II and III establish that the optimum concentration range of formaldehyde (or its polymers) is from 50 to 500 parts per million with respect to the as is weight of the grist and that the greatest reduction in anthocyanogen content is achieved when the formaldehyde, or its polymers, is added at the commencement of mashing.

Conditional upon mashes being prepared according to the Standard Method of the Institute of Brewing (as specified above) the addition of 50 to 1000 parts per million with respect to the as is weight of the grist is equivalent to the addition of 5 to 100 parts per million with respect to the final volume of wort.

*Example*

In a particular procedure wort was prepared by the addition of 500 parts per million of formaldehyde with respect to the as is weight of malt grist. The additive in liquid form was introduced to the solution of malt grist and water in the masher immediately at the commencement of the mashing operation. The conditions under which the procedure was carried out were those conventionally prevailing in making wort. The wort so produced was used to prepare beer according to the details given in relation to Table VII.

I claim:

1. The method of at least partially removing anthocyanogens from wort, which comprises introducing into wort mash an additive soluble in aqueous solution selected from the group consisting of formaldehyde and polymers thereof in amounts of 50 to 500 parts per million parts by weight of the grist from which the wort is made, and at a stage in production of the wort sufficiently early to avoid undesirable side effects otherwise caused by said additive.

2. The method of at least partially removing anthocyanogens from wort, which comprises introducing into wort mash an additive soluble in aqueous solution selected from the group consisting of formaldehyde and polymers thereof in amounts of 50 to 500 parts per million parts by weight of the grist from which the wort is made, said additive being introduced before the end of the total time of the mashing operation.

3. The method according to claim 2 wherein said additive is introduced before the end of the first half of the total time of operation.

4. A method according to claim 1 wherein the said additive is introduced into the mash while mashing the grist from which the wort is prepared.

5. A method according to claim 4 wherein the additive is introduced into the mash at a point in time towards the beginning of the mashing operation.

6. A method according to claim 1 wherein the additive is introduced into the mash together with at least one of the mash ingredients.

7. A method according to claim 1 wherein the additive is introduced into the mash during the first quarter of the total time of the mashing operation.

8. A method according to claim 1 wherein the additive is introduced into the mash during the first half of the total time of the mashing operation.

9. A method according to claim 1 wherein the additive is introduced into the mash during the first sixth of the total time of the mashing operation.

10. A method according to claim 1 wherein the additive is solubilised paraformaldehyde.

References Cited

UNITED STATES PATENTS

| 2,901,401 | 8/1959 | Grimm et al. | 195—71 |
| 3,053,664 | 9/1962 | Hall et al. | 99—48 |
| 3,117,004 | 1/1964 | McFarlane | 99—28 |

OTHER REFERENCES

Urquhart: Note on Some Experimental Steeping Treatments of Malting Barley, Journal Institute of Brewing, vol. 59, 1953, pages 56–58.

A. LOUIS MONACELL, *Primary Examiner.*

D. M. STEPHENS, M. W. GREENSTEIN,
*Assistant Examiners.*